(12) United States Patent
Kobori et al.

(10) Patent No.: US 10,599,312 B2
(45) Date of Patent: *Mar. 24, 2020

(54) ELECTRONIC APPARATUS AND METHOD FOR CONTROLLING DISPLAY SCREEN OF ELECTRONIC APPARATUS

(71) Applicant: Wacom Co., Ltd., Saitama (JP)

(72) Inventors: Takeshi Kobori, Ibaraki (JP); Sadao Yamamoto, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/952,617

(22) Filed: Apr. 13, 2018

(65) Prior Publication Data
US 2018/0232131 A1 Aug. 16, 2018

Related U.S. Application Data

(63) Continuation of application No. 13/331,895, filed on Dec. 20, 2011, now Pat. No. 9,971,486.

(30) Foreign Application Priority Data

Sep. 15, 2011 (JP) ................................ 2011-202464

(51) Int. Cl.
*G06F 3/0484* (2013.01)
*G06F 3/0488* (2013.01)
(Continued)

(52) U.S. Cl.
CPC ...... *G06F 3/04845* (2013.01); *G06F 3/04883* (2013.01); *G06F 3/044* (2013.01); *G06F 3/048* (2013.01); *G06F 3/0488* (2013.01)

(58) Field of Classification Search
CPC .. G06F 3/04845; G06F 3/04883; G06F 3/044; G06F 3/048; G06F 3/0428; G06F 3/0488; G06F 1/1641; G06F 1/1643
(Continued)

(56) References Cited

U.S. PATENT DOCUMENTS 8,466,896 B2  6/2013  Stephanick et al.
2002/0008691 A1* 1/2002 Hanajima ........... G06F 3/04847
                                                                345/173
(Continued)

FOREIGN PATENT DOCUMENTS

JP   2007-164356 A   6/2007
JP   1 806 647 B1   11/2015

OTHER PUBLICATIONS

Extended European Search Report, dated Jul. 2, 2014, for European Application No. 12153800.3-1959 / 2570898, 9 pages.

*Primary Examiner* — Kent W Chang
*Assistant Examiner* — Sujit Shah
(74) *Attorney, Agent, or Firm* — Seed IP Law Group LLP

(57) ABSTRACT

Apparatus and method are provided that are capable of controlling a display in response to reliable detection of a sliding movement operation of a pointer (e.g., a user's finger) that passes through an end of a display region. The apparatus and method utilize a position detection sensor, which is superposed on the display and configured to detect the pointer's position discretely and successively at a predetermined time interval. Based on a first position detected by the position detection sensor and a second position detected, at the predetermined time interval since the detection of the first position, by the position detection sensor, which together indicate a moving operation of the pointer, it is determined whether the moving operation of the pointer has crossed an end of the display region. If it is so determined, a passed end position of the display region is calculated based on the first and second positions.

18 Claims, 13 Drawing Sheets

(51) Int. Cl.
*G06F 3/048* (2013.01)
*G06F 3/044* (2006.01)

(58) Field of Classification Search
USPC .................................................. 345/156–179
See application file for complete search history.

(56) References Cited

U.S. PATENT DOCUMENTS

| | | |
|---|---|---|
| 2005/0030293 A1 | 2/2005 | Lai |
| 2005/0168441 A1 | 8/2005 | Obitsu et al. |
| 2007/0018968 A1 | 1/2007 | Iwamoto et al. |
| 2007/0030256 A1 | 2/2007 | Akaike et al. |
| 2008/0100589 A1* | 5/2008 | Tsao .................... G06F 1/1601 345/173 |
| 2010/0105443 A1 | 4/2010 | Vaisanen |
| 2010/0245275 A1* | 9/2010 | Tanaka .................. G06F 1/1624 345/173 |
| 2010/0302172 A1 | 12/2010 | Wilairat |
| 2011/0001706 A1 | 1/2011 | Sanford et al. |
| 2011/0157029 A1 | 6/2011 | Tseng et al. |
| 2011/0209093 A1 | 8/2011 | Hinckley et al. |
| 2011/0209099 A1* | 8/2011 | Hinckley .............. G06F 3/0483 715/863 |
| 2012/0050177 A1* | 3/2012 | Simmons ............. G06F 1/1641 345/173 |
| 2012/0056822 A1 | 3/2012 | Wilson et al. |
| 2012/0098766 A1 | 4/2012 | Dippel et al. |
| 2012/0154303 A1 | 6/2012 | Lazaridis et al. |
| 2012/0162863 A1 | 6/2012 | Caldwell |

* cited by examiner

FIG.1
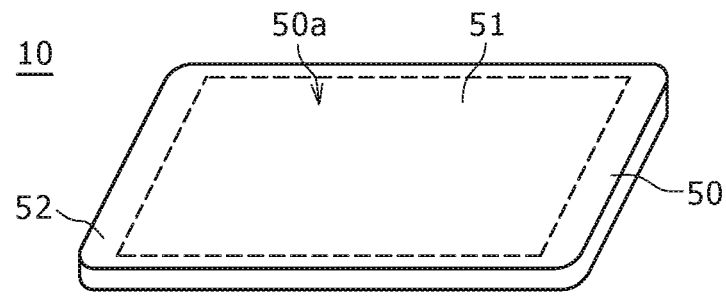
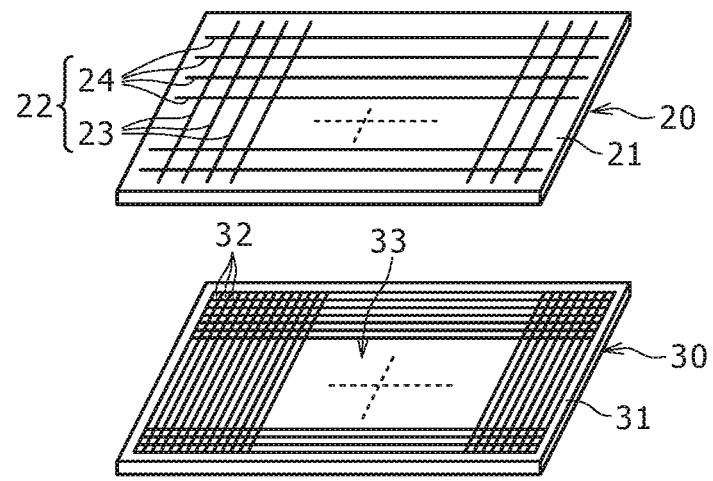
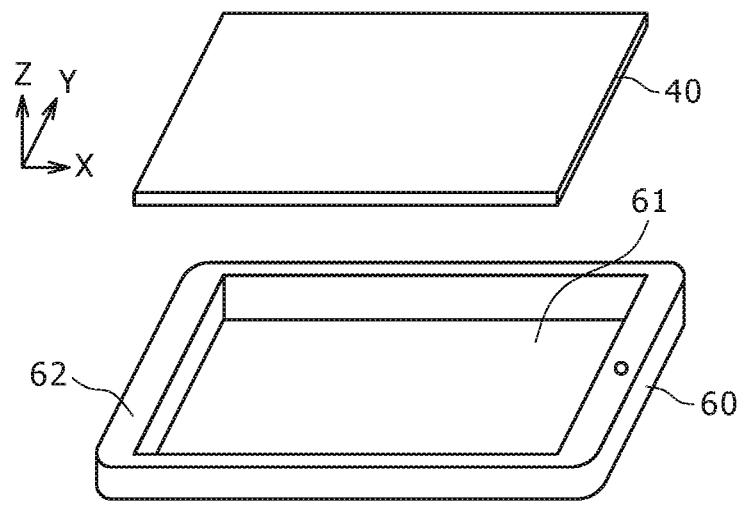

ELECTRONIC APPARATUS AND METHOD FOR CONTROLLING DISPLAY SCREEN OF ELECTRONIC APPARATUS

CROSS-REFERENCE TO RELATED APPLICATION

The present application claims priority under 35 U.S.C. § 119(a) of Japanese Application No. 2011-202464, filed Sep. 15, 2011, which application is incorporated herein by reference in its entirety.

BACKGROUND

Technical Field

The present invention relates to an electronic apparatus, which includes a display device and a position detection sensor disposed in a superposed relationship with the display device, and a display screen controlling method for the electronic apparatus.

Description of the Related Art

In recent years plane type display devices (flat display panels) such as liquid crystal display devices and organic EL (electroluminescence) display devices have been used as popular display apparatuses. Also, many electronic apparatuses have become available in which a position detection sensor is disposed in a superposed relationship with a flat display panel such that an input position on a display screen pointed to by a pointer, such as a finger or an inputting pen, can be detected by the position detection sensor to thereby carry out various controlling processes for the electronic apparatuses.

For example, in an electronic apparatus 1 disclosed in Patent Document 1 (U.S. Published Application No. 2011/0209099A1) and as shown in FIG. 13A, when a pointer 2, such as a user's finger or a pen, carries out a moving operation that passes through an end of a display region of a display screen 3 (e.g., an upper end of the display region in FIG. 13A), a position detection sensor detects an end position of the display region that is passed by the moving operation. Then, using a detection output of the end position of the display region from the position detection sensor as a trigger, the electronic apparatus 1 carries out an action such as opening of a predetermined menu 4 as shown in FIG. 13B.

PRIOR ART DOCUMENT

Patent Document

[Patent Document 1] U.S. Published Application No. 2011/0209099A1

BRIEF SUMMARY

In recent electronic apparatuses such as portable telephone terminals, while a control circuit formed of a microcomputer is configured to carry out various controlling processes since requests for multiple tasks and processes are becoming more common, it has become difficult to increase the processing speed of each task. For example, the control circuit must control a position detection process by the position detection sensor and at the same time carry out a display controlling process based on a result of the position detection, to thereby carry out a controlling process of a predetermined graphical user interface.

Further, achieving a high-speed process leads to an increased power consumption and, as such, a high-speed process may be difficult to implement from the power consumption point of view particularly in a portable telephone terminal, which is a battery-driven small electronic apparatus for which the battery life is an important consideration factor.

In a position detection sensor in an electronic apparatus, a demand for multiple touches is also increasing, rendering achieving a high-speed process even more difficult. Typically, a position detection sensor executes position detection of a pointer discretely at a predetermined time interval to output detected pointed positions discretely as a result of the position detection. Accordingly, when a user carries out an operation of touching and moving a pointer on a sensor (hereinafter referred to as a "sliding movement operation"), coordinates outputted as a result of the position detection of the pointer are successively obtained at the predetermined time interval according to the signal processing speed of the position detection.

Therefore, when a user performs a sliding movement operation, using a finger or a pen, which passes through an end of the display region of the display screen, the position detection sensor may not be able to detect an end position of the display region depending on the detection timing, for example, if the timing at which an end position is passed does not coincided with the discrete detection timing.

The present invention according to one aspect is directed to providing an electronic apparatus which can reliably detect an end of a display region of a display device.

According to one aspect of the present invention, there is provided an electronic apparatus which includes:

a display device having a predetermined display region, a position detection sensor disposed in a superposed relationship with the display device, configured to detect a position pointed to by a pointer in the predetermined display region, and further configured to discretely detect the pointed positions at a predetermined time interval, a plane member having a first surface side and a second surface side opposite from the first surface side, the first surface side being configured for use as an operation face for position pointing by the pointer, and the position detection sensor and the display device being disposed at the second surface side, a decision circuit configured to determine, in response to a moving operation of the pointer in a first direction on the operation face, whether or not the moving operation of the pointer in the first direction has passed an end of the predetermined display region of the display device based on a first position detected by the position detection sensor and a second position detected at the predetermined time interval after the detection of the first position, a display region end position calculation circuit configured to calculate an end position of the predetermined display region of the display device based on the position detected by the position detection sensor when it is determined by the decision circuit that the moving operation of the pointer in the first direction has passed an end of the predetermined display region of the display device, and a display controlling circuit configured to control a display screen of the display device in response to the calculation of the end position by the display region end position calculation circuit.

In the electronic apparatus according to the present invention having the configuration described above, the decision circuit decides whether or not a moving operation of the pointer in the first direction has passed an end of the predetermined display region of the display device. Then, when it is decided by the decision circuit that an end of the predetermined display region is passed, the display region end calculation circuit calculates the end position of the display region based on a position detected by the position detection sensor. Accordingly, with such embodiment of the present invention, even though only discrete positions of a pointer are determined by the position detection sensor, the end position of the display region can be reliably calculated.

Then, based on the calculation of the end position of the display region by the display region end calculation circuit, display control, such as to change the display contents of the display screen, is carried out.

With the present invention, even though the positions of the pointer detected by the position detection sensor are discrete positions, an end position of the display region can be reliably identified. Accordingly, even when a pointer performs a moving operation to pass through an end of the display region on the operation face, it is possible to reliably control the display screen in response to the moving operation of the pointer.

BRIEF DESCRIPTION OF THE SEVERAL VIEWS OF THE DRAWINGS

FIG. 1 is an exploded perspective view of an example of a hardware configuration of an electronic apparatus according to an embodiment of the present invention.

DETAILED DESCRIPTION

First Embodiment

Figure 2:
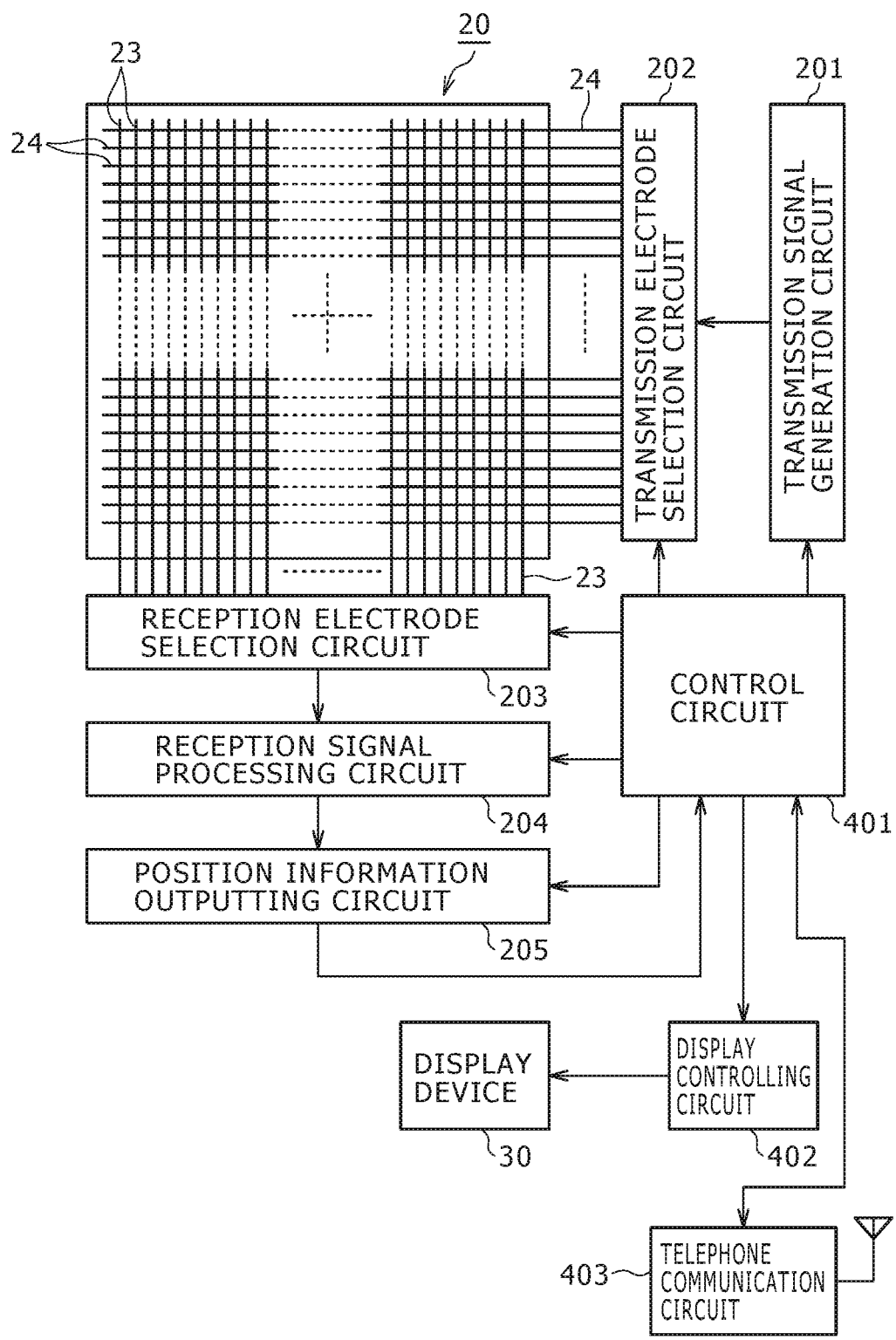
FIG. 2 is a block diagram of an example of a main circuit configuration of the electronic apparatus according to an embodiment of the present invention.

FIG. 1 is an exploded schematic view of an electronic apparatus according to a first embodiment of the present invention. FIG. 1 shows an example in which the electronic apparatus is a portable telephone terminal including a position detection sensor of the capacitive type configured to detect a position pointed to by a pointer, such as a finger or a position pointing pen, on a display screen of a display device.

As shown in FIG. 1, the portable telephone terminal 10 of the present example includes a position detection sensor 20, a display device 30, a control circuit board 40, a plane member 50, and a housing 60.

The position detection sensor 20 in this example is configured as a cross point capacitive type sensor capable of detecting multiple touches. In this example, the position detection sensor 20 is formed such that a transparent electrode group 22 consisting of a plurality of electrodes having optical transparency is formed on one face of a transparent board 21 (i.e., a face opposite to the face that opposes a display screen 33 of the display device 30). The transparent board 21 is formed, for example, of a glass substrate or a resin film substrate.

The transparent electrode group 22 includes a plurality of first transparent electrodes 23 disposed in a Y axis direction and a plurality of second transparent electrodes 24 disposed in an X axis direction. The first transparent electrodes 23 are disposed in a spaced relationship with a predetermined distance from each other in the X axis direction. The second transparent electrodes 24 are disposed in a spaced relationship with a predetermined distance from each other in the Y axis direction. The first transparent electrodes 23 and the second transparent electrodes 24 are each configured of a conductor formed of a light transmitting conductive material such as an ITO film.

In the present example, the first transparent electrodes 23 and the second transparent electrodes 24 are formed on the same face of the transparent board 21. Therefore, in each region of cross points, which are intersecting points between the first transparent electrodes 23 and the second transparent electrodes 24 that extend perpendicularly to each other, an insulating material is disposed between the first transparent electrode 23 and the second transparent electrode 24 to electrically isolate the first transparent electrode 23 from the second transparent electrode 24.

The display device 30 is formed of a flat display unit, such as a liquid crystal display unit or an organic EL display unit, and includes a display screen 33 wherein a large number of display pixels 32 are arrayed in the X axis direction (longitudinal direction) and arrayed in the Y axis direction (lateral direction) perpendicular to the X axis direction. The position detection sensor 20 is disposed in a superposed relationship on the display screen 33 of the display device 30.

Figure 3:
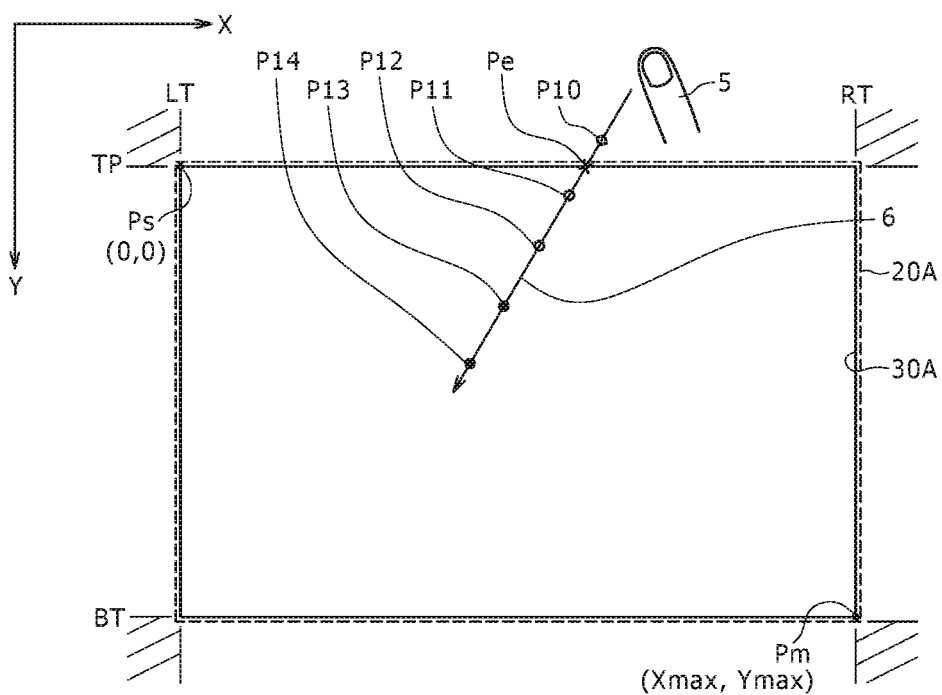
FIG. 3 is a view illustrating an end position detection process performed relative to a display region of the electronic apparatus according to an embodiment of the present invention.

In the present example, as shown in FIG. 3, the position detection sensor 20 has a detection region 20A (defined by a frame of a broken line in FIG. 3) of a rectangular shape, within which a position pointed to by a pointer can be detected. The detection region 20A is a region of a size substantially equal to or a little greater than a rectangular display region 30A (defined by a frame of a solid line in FIG. 3) of the display screen 33 of the display device 30.

As shown in FIG. 3, the coordinates of, for example, the upper left point Ps of the rectangular display region 30A of the display screen 33 in the detection region 20A are set as (0, 0) or the origin of the display region 30A, and the coordinates of the lower right point Pm of the display region 30A are set as the maximum coordinates (Xmax, Ymax) of the display region 30A. Consequently, the position detection sensor 20 can output a pointed position of a pointer for the entire range of the display region 30A as a position of (X, Y), where 0≤X≤Xmax and 0≤Y≤Ymax.

The position coordinates of the ends of the display region 30A are defined based on the fact that the position coordinates of the left end position LT are (0, Y); the position coordinates of the right end position RT are (Xmax, Y); the position coordinates of the upper end position TP are (X, 0); and the position coordinates of the lower end position BT are (X, Ymax). In other words, an end position of the display region 30A can be determined as a position, at which the coordinates (X, Y) satisfy X=0 or Xmax or Y=0 or Ymax.

The position detection sensor 20 and the display device 30 are placed one on the other and positioned relative to each other such that the display region 30A of the display screen 33 of the display device 30 has a coordinate positional relationship to the detection region 20A of the position detection sensor 20 as shown in FIG. 3. The position detection sensor 20 and the display device 30 are configured such that, even when it is difficult to carry out such relative positioning in advance, it is possible to carry out calibration to establish the correct positional relationship to set the upper left point Ps of the display region 30A as the origin coordinates (0, 0) and to set the lower right point Pm as the maximum coordinates (Xmax, Ymax).

Referring back to FIG. 1, a microcomputer for controlling the portable telephone terminal 10 and other electronic parts and copper foil wiring line patterns are mounted on the control circuit board 40. Also provided on the control circuit board 40 are a sensor circuit for the position detection sensor 20, a display controlling circuit for the display device 30, and a telephone communication circuit and so forth.

The plane member 50 in the present example is made of a transparent material such as glass or resin, and one surface 50a is made as an operation face for position pointing by a pointer, such as a finger or a pointing pen. The position detection sensor 20 and the display device 30 are disposed on the other surface of the plane member 50, which is on the opposite side from the surface 50a of the plane member 50.

In the present example, the plane member 50 has a shape that is sized a little greater than the position detection sensor 20. In particular, in the plane member 50 of FIG. 1, a region 51 indicated by a frame of a broken line is a region to which the position detection sensor 20 corresponds, and a frame region 52 is formed around the region 51. Though not shown, the plane member 50 may be formed by applying, for example, silk screen printing or the like to the frame region 52 to make the frame region 52 opaque, while maintaining the region 51 in a transparent state.

The housing 60 is formed of synthetic resin, for example. In the housing 60, a concave portion 61 is formed for accommodating the transparent board 21, on which the position detection sensor 20 is disposed, the display substrate 31, and the control circuit board 40. After the transparent board 21, on which the position detection sensor 20 is disposed, the display substrate 31, and the control circuit board 40 are accommodated into the concave portion 61, the frame region 52 of the plane member 50 is coupled to a frame region 62 of the housing 60, with a bonding agent for example, to close up the concave portion 61, thereby completing the assembly of the portable telephone terminal 10.

FIG. 2 is a block diagram of a configuration of a circuit section of the control circuit board 40 of the portable telephone terminal 10, which principally shows a sensor circuit section. In particular, the control circuit board 40 includes, in addition to the sensor circuit section, a control circuit 401 for controlling the entire portable telephone terminal 10 in the present example, a display controlling circuit 402 for controlling a display image to be displayed on the display screen of the display device 30, a telephone communication circuit 403, and so forth.

The sensor circuit section includes, as shown in FIG. 2, a transmission signal generation circuit 201, a transmission electrode selection circuit 202, a reception electrode selection circuit 203, a reception signal processing circuit 204, and a position information outputting circuit 205. The sensor circuit section in the present embodiment executes a position detection process discretely at a predetermined time interval, for example, every 10 msec under the control of the control circuit 401, to detect a plurality of touches on the position detection sensor individually to obtain their respective positions.

The transmission signal generation circuit 201 and the transmission electrode selection circuit 202 form a transmission signal supplying circuit, and the reception electrode selection circuit 203 and the reception signal processing circuit 204 form a signal reception circuit. Further, in the present example, the first transparent electrodes 23 are used as reception electrodes, and the second transparent electrodes 24 are used as transmission electrodes.

The transmission signal generation circuit 201 supplies a predetermined transmission signal to the transmission electrode selection circuit 202 at a predetermined timing under the control of the control circuit 401. The transmission electrode selection circuit 202 selects a predetermined second transparent electrode 24 under the selection control of the control circuit 401. To the second transparent electrode 24 selected by the transmission electrode selection circuit 202, the transmission signal is supplied from the transmission signal generation circuit 201.

The reception electrode selection circuit 203 sequentially selects a first transparent electrode 23 under the control of the control circuit 401 and supplies a reception signal from the selected first transparent electrode 23 to the reception signal processing circuit 204.

The reception signal processing circuit 204 processes the reception signal under the control of the control circuit 401 to detect a signal variation caused in the first transparent electrode 23 by a pointer, such as a finger or a pointing pen, which is pointing to a position on the position detection sensor, and supplies a detection output to the position information outputting circuit 205.

The position information outputting circuit 205 produces, under the control of the control circuit 401, a coordinate output which is a pointed position detection signal corresponding to a position pointed to by a pointer, such as a finger or a position pointer, based on a first transparent electrode 23, in which a signal variation occurred (as determined from a detection output from the reception signal processing circuit 204), and a second transparent electrode 24, to which a transmission signal was supplied when the signal variation occurred, and outputs the coordinate output to the control circuit 401.

Further, the position information outputting circuit 205 in the present embodiment has a function of calculating, upon detecting that a sliding movement operation that passes through an end of the display region of the display device 30 is carried out by a pointer, position coordinates of the passed end of the display region and outputting a coordinate output of the calculated end position to the control circuit 401.

The control circuit 401 receives coordinate outputs of position detection results from the position information outputting circuit 205 to thereby detect a pointing indication operation or a moving operation (e.g., a gesture operation) by a pointer, and controls a screen image to be displayed on the display device 30 in response to the results of the detection. Further, when a coordinate output of an end position of the display region of the display device 30 is received, the control circuit 401 determines that a sliding movement operation, which passes through an end of the display region of the display device 30, has been carried out, and the screen image to be displayed on the display device 30 is controlled in response to the sliding movement operation.

For example, when the control circuit 401 determines from a coordinate output from the position information outputting circuit 205 that the pointing operation of the pointer is a pointing indication operation to an object such as an icon in the display region 30A of the display device 30, the control circuit 401 executes a process corresponding to the object indicated by the pointing indication operation such as to execute (or activate) the indicated object. On the other hand, when the control circuit 401 determines from a coordinate output of the position information outputting circuit 205 that the pointing operation of the pointer in the display region 30A of the display device 30 is a moving operation, the control circuit 401 executes a process for an object (e.g., an icon) of the moving operation such as to move, expand, or reduce, or rotate the object.

Further, when the control circuit 401 determines from a coordinate output of the position information outputting circuit 205 that the pointing operation of a pointer is a sliding movement operation that passes through an end of the display region 30A of the display device 30, the control circuit 401 carries out a display controlling process to display an image on the display screen 33 to facilitate an indication operation regarding overall control of the portable telephone terminal 10, such as to display a system menu.

In this example, depending upon whether the sliding movement operation is carried out at an end position of the display region 30A in a direction from the outside toward the inside of the display region 30A or in another direction from the inside to the outside of the display region 30A, the control circuit 401 carries out display control such as to display different menus or to treat a detection result of an end position in the sliding movement operation in a predetermined direction as a "return" indication.

In this example, the system menu to be displayed may be changed depending upon whether the end of the display region 30A passed by the sliding movement operation is a left end, a right end, an upper end, or a lower end. Additionally or alternatively, for example, when an upper end of the display region 30A is passed by the sliding movement operation, the menu to be displayed on the display screen 33 may be changed depending on a different end position at which the upper end is passed.

Outline of the Detection Process of an End Position of the Display Region 30A In the Case of a Sliding Movement Operation from the Outside to the Inside of the Display Region 30A As described hereinabove, the position information outputting circuit 205 in the present embodiment has a function of determining, when a sliding movement operation is carried out by a pointer, whether or not the sliding movement operation is a sliding movement operation that has passed through an end of the display screen 33 of the display device 30 and then, when it is determined that the sliding movement operation is a sliding movement operation that has passed through an end of the display screen 33 of the display device 30, calculating coordinates of an end position at which the end of the display region is passed and outputting a coordinate output of the calculated end position to the control circuit 401.

FIG. 3 illustrates a manner in which the pointer 5, such as a finger, slidably moves from the outside of the display region 30A of the display screen 33 of the display device 30 to the inside of the display region 30A, while crossing (passing) an upper end position TP (X, 0) of the display region 30A, where 0≤X≤Xmax.

As described hereinabove, the position detection sensor 20 in the portable telephone terminal 10 of the present embodiment discretely completes a series of position detection operations for all cross points of the detection region 20A in a unit of 10 msec, and supplies a detected coordinate output of the pointer 5 to the control circuit 401.

In the example of FIG. 3, as the pointer 5 slidably moves in a direction indicated by an arrow 6, the position detection sensor 20 outputs a position P11 as a coordinate output at a first point and, after lapse of 10 msec, outputs another position P12 as a coordinate output at a second point. Then, the position detection sensor 20 outputs, after another lapse of 10 msec, a position P13 as a coordinate output at a third point, and so forth.

In the present embodiment, when the position P11 of the first point is detected, the position information outputting circuit 205 does not immediately supply a coordinate output of the position P11 of the first point, and instead stores the coordinate output as "preceding cycle detected position information" into a buffer memory provided in the position information outputting circuit 205. Then, when the position P12 of the second point is detected, the position information outputting circuit 205 estimates, based on the position P12 and the position P11 of the first point stored in the buffer memory, a position P10 of the 0th point, that is, the virtual position of the pointer at a time one cycle prior to the time of the first point.

In the present embodiment, the estimation of the position P10 is carried out based on the assumption that the sliding movement is a linear movement and the speed of the sliding movement is fixed. In particular, a linear line interconnecting the position P11 of the first point and the position P12 of the second point is extended in a direction so as to pass the upper end, and the virtual position P10 is calculated as a position on the linear line that is spaced from the position P11 of the first point by the same distance between the position P11 of the first point and the position P12 of the second point.

Then, it is determined whether or not the estimated position P10 of the pointer at the 0th point is outside of one of the left end, right end, upper end, or lower end of the display region 30A. In the example of FIG. 3, it is determined that the estimated position P10 of the pointer at the 0th point is outside the upper end position TP. Therefore, the position information outputting circuit 205 detects an end position Pe passed by the pointer in the sliding movement operation as an intersecting point between the upper end and a line segment interconnecting the estimated position P10 and the position P11 of the first point.

The position information outputting circuit 205 supplies the detected end position Pe to the control circuit 401, in place of the position P12 of the second point. In the present example, the position P11 of the first point is not outputted to the control circuit 401 either, so the position information outputting circuit 205 supplies only the detected end position Pe to the control circuit 401, in place of a coordinate output of the positions of the first point and the second point.

When a sliding movement operation of a pointer that passes an end position of the display region 30A is carried out, it is possible that the user meant to merely pass an end position of the display region 30A, and did not intend to have the first point and the second point along the sliding movement operation that passes an end position of the display region 30A to be detected as pointed positions. Thus, it may be a useless operation to output coordinates of the detected positions of the first point and the second point to trigger the control circuit 401 to carry out some controlling process. Such potentially useless operation can be avoided when the detected end position Pe, in place of the coordinate output of the positions of the first point and the second point, is supplied to the control circuit 401 as in the present embodiment.

The position information outputting circuit 205 in the present embodiment adds, to a coordinate output of an end position, a flag indicating that the end position is an end position passed by a sliding movement operation from the outside to the inside of the display region 30A, and supplies the flag to the control circuit 401 together with the coordinate output of the end position.

When the control circuit 401 receives the coordinate output of the end position and the flag from the position information outputting circuit 205, the control circuit 401 recognizes the received end position as an end position passed by a sliding movement operation from the outside to the inside of the display region 30A, and carries out display control accordingly as described above.

When the end of the display region 30A passed by a sliding movement operation in a direction from the outside to the inside of the display region 30A is a left end, a right end, or a lower end also, the position information outputting circuit 205 can carry out detection of the end position in a manner similar to that described above.

It is to be noted that, in the present embodiment, an upper left oblique region, a lower left oblique region, an upper right oblique region, and a lower right oblique region, which are indicated by slanting lines in FIG. 3, are defined as exterior regions outside the region for detection of an end position. This is because, when a sliding movement operation is carried out from any of the exterior regions to the inside of the display region 30A, it is difficult to determine which one of adjacent ends of the display region 30A, such as the upper end or the left end, the lower end or the left end, the lower end or the right end, or the upper end or the right end, is passed through.

Figure 4:
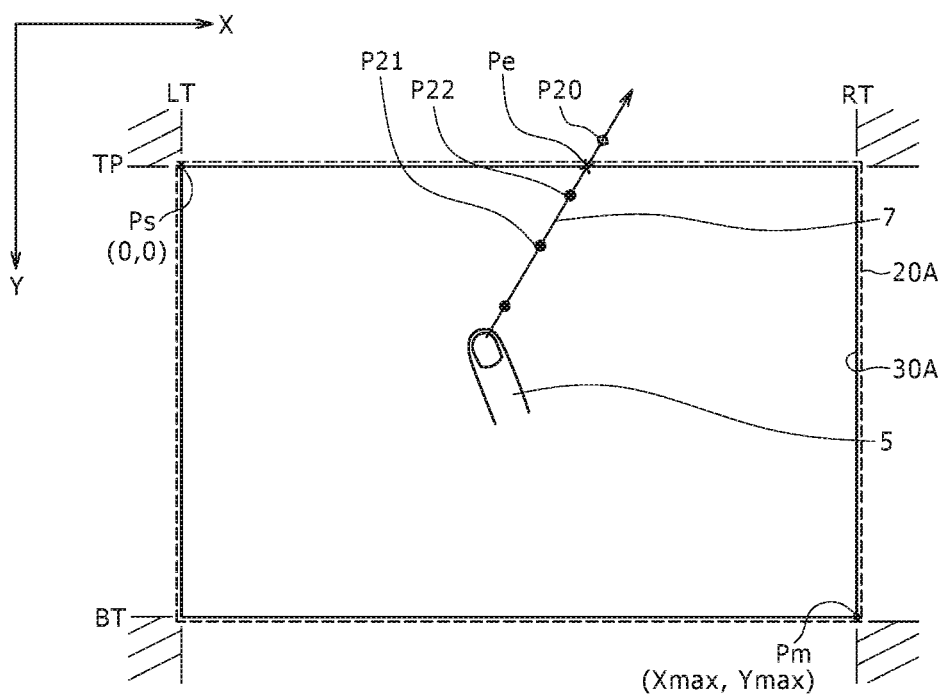
FIG. 4 is another view illustrating an end position detection process performed relative to the display region of the electronic apparatus according to an embodiment of the present invention.

In the Case of a Sliding Movement Operation from the Inside to the Outside of the Display Region 30A FIG. 4 is a view illustrating a manner in which the pointer 5, such as a finger, slidably moves from the inside of the display region 30A of the display screen 33 of the display device 30 to the outside of the display region 30A, while crossing (passing) an upper end position TP (X, 0) of the display region 30A, where 0≤X≤Xmax, as indicated by an arrow 7.

In the example of FIG. 4, as the pointer 5 slidably moves in the direction indicated by the arrow 7, the position detection sensor 20 outputs a position P21 at a certain point in time, and outputs another position P22 after lapse of 10 msec, but after lapse of another 10 msec, the pointer position will be outside the detection region 20A and therefore cannot be detected and no coordinate output will be obtained.

In the present embodiment, if it is detected, after lapse of 10 msec since the time when the position P22 is outputted, that no coordinate output is obtained, then the position information outputting circuit 205 assumes that the pointer 5 is slidably moving at an equal speed along a linear route, which passes the position P22 from the position P21, to thereby estimate a virtual position P20 of the pointer. In particular, a linear line interconnecting the position P21 and the position P22 is extended in a direction so as to pass the upper end, and the virtual position P20 is calculated as a position on the extended line that is spaced from the position P22 by the same distance between the position P21 and the position P22.

Similarly as in the case of the example of FIG. 3, it is then determined whether the estimated virtual position P20 of the pointer is outside of one of the left end, right end, upper end, and lower end of the display region 30A. In the example of FIG. 4, it is determined that the estimated virtual position P20 of the pointer is outside the upper end position TP. Therefore, the position information outputting circuit 205 calculates an end position Pe passed by the sliding movement operation of the pointer as an intersecting point between the upper end and a line segment, which interconnects the estimated position P20 and the position P22 that is the position at a time one cycle prior to the time of the position P20.

When the end of the display region 30A passed by a sliding movement operation is the left end, the right end, or the lower end also, the position information outputting circuit 205 can detect the end position in a similar manner. The position information outputting circuit 205 in the present embodiment adds a flag indicating that the end position is an end position passed by a sliding movement operation from the inside to the outside of the display region 30A, and supplies the flag to the control circuit 401 together with the coordinate output of the end position.

If the position information outputting circuit 205 supplies a coordinate output of this end position and the flag to the control circuit 401, then the control circuit 401 recognizes the received end position as an end position passed by a sliding movement operation from the inside to the outside of the display region 30A, and carries out display control accordingly as described above.

Likewise, when the end of the display region 30A passed by a sliding movement operation in a direction from the inside to the outside of the display region 30A is a left end, a right end, or a lower end, the position information outputting circuit 205 can carry out detection of the end position in a similar manner as described above.

Details of Processing of the Sensor Circuit Section Including the Position Information Outputting Circuit 205

Now, an example of a processing operation of the sensor circuit section in the present embodiment is described with reference to flow charts of FIGS. 5 to 9. The processing of the flow charts is executed mainly by the position information outputting circuit 205.

Figure 5:
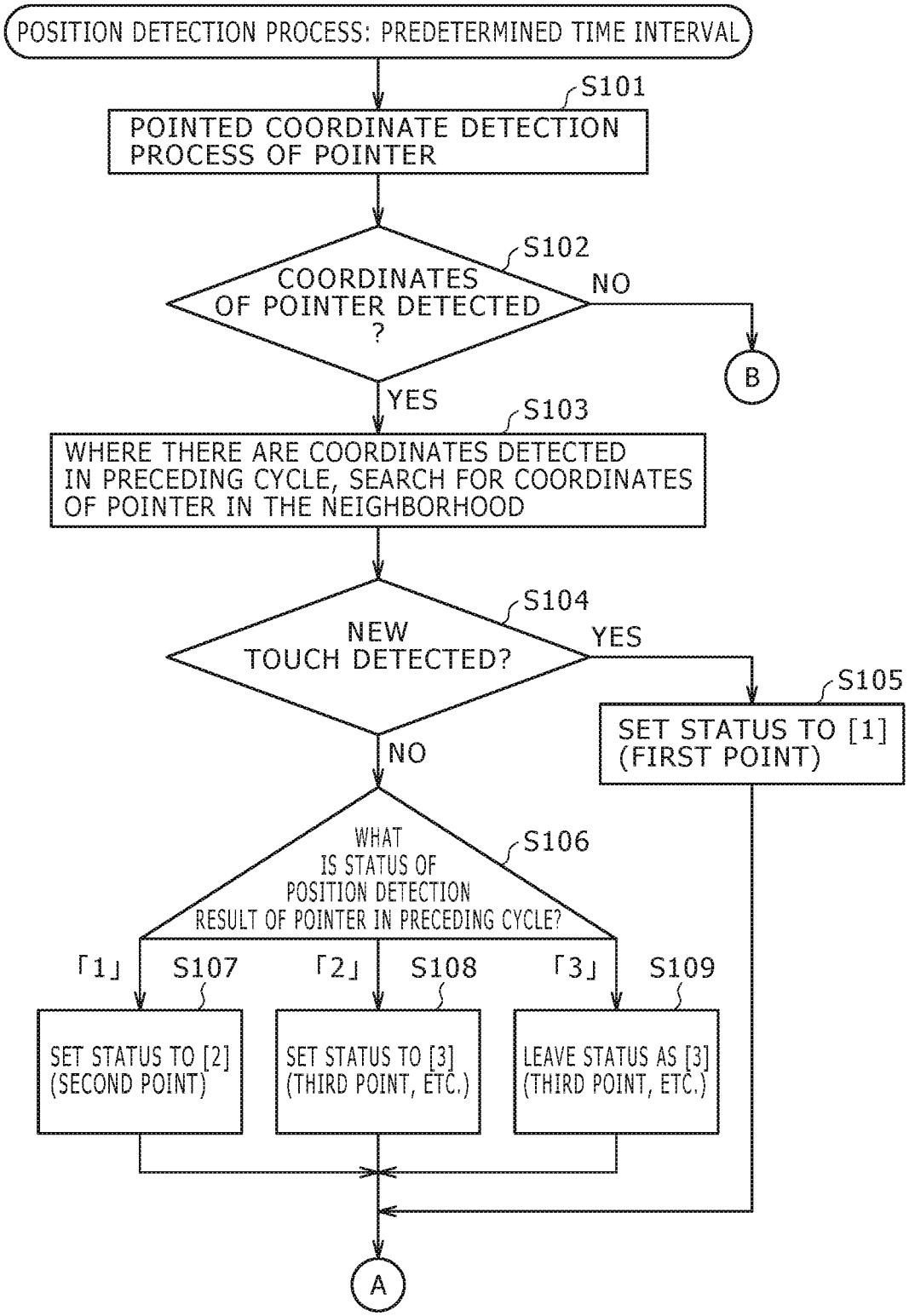
FIGS. 5-7 together illustrate a flow chart of an end position detection process performed relative to the display region of the electronic apparatus according to an embodiment of the present invention.

As described hereinabove, the sensor circuit section in the present example executes the processing of the flow charts of FIGS. 5 and 6, every 10 msec.

First, after elapse of 10 msec since the position detection process in a preceding cycle, the sensor circuit section executes a pointed coordinate detection process of the pointer (step S101). The position information outputting circuit 205 determines whether or not coordinates of a pointer are detected by the pointed coordinate detection process of a pointer (step S102). When it is determined at step S102 that coordinates of a pointer are detected, the position information outputting circuit 205 searches, if coordinates detected in the preceding cycle are available, for coordinates of a pointer located in the proximity of the coordinate position detected in the present cycle (step S103) and determines whether or not the coordinates detected in the presence cycle should be treated as a detected position of a new touch (step S104). In particular, if no coordinates are located in the proximity of the coordinate position detected in the present cycle, then it is determined that the touch is a new touch. On the other hand, if coordinates of a pointer are located in the proximity of the coordinate position detected in the present cycle, then it is determined that the present touch is not a new touch.

Then, if it is determined at step S104 that the coordinates detected in the present cycle are those of a detected position of a new touch, then a status of a position detection result of the pointer in the present cycle is set to a status "1" indicative of detection of the first point (step S105).

On other hand, if it is determined at step S104 that the coordinates detected in the present cycle are not those of a detected position of a new touch, then the position information outputting circuit 205 will determine what is the status of a position detection result of the pointer in the preceding cycle (step S106).

If it is determined at step S106 that the status of the position detection result of the pointer in the preceding cycle is the status "1" indicative of detection of the first point, then the status of the position detection result of the pointer in the present cycle is set to a status "2" indicative of detection of the second point (step S107).

On the other hand, if it is determined at step S106 that the status of the position detection result of the pointer in the preceding cycle is the status "2" indicative of detection of a second point, then the status of the position detection result of the pointer in the present cycle is set to a status "3" indicative of detection of the third or succeeding point (step S108).

Also, if it is determined at step S106 that the status of the position detection result of the pointer in the preceding cycle is the status "3" indicative of detection of a third point or succeeding point, then the status of the position detection result of the pointer in the present cycle remains the status "3" indicative of detection of the third or succeeding point (step S109).

Figure 6:
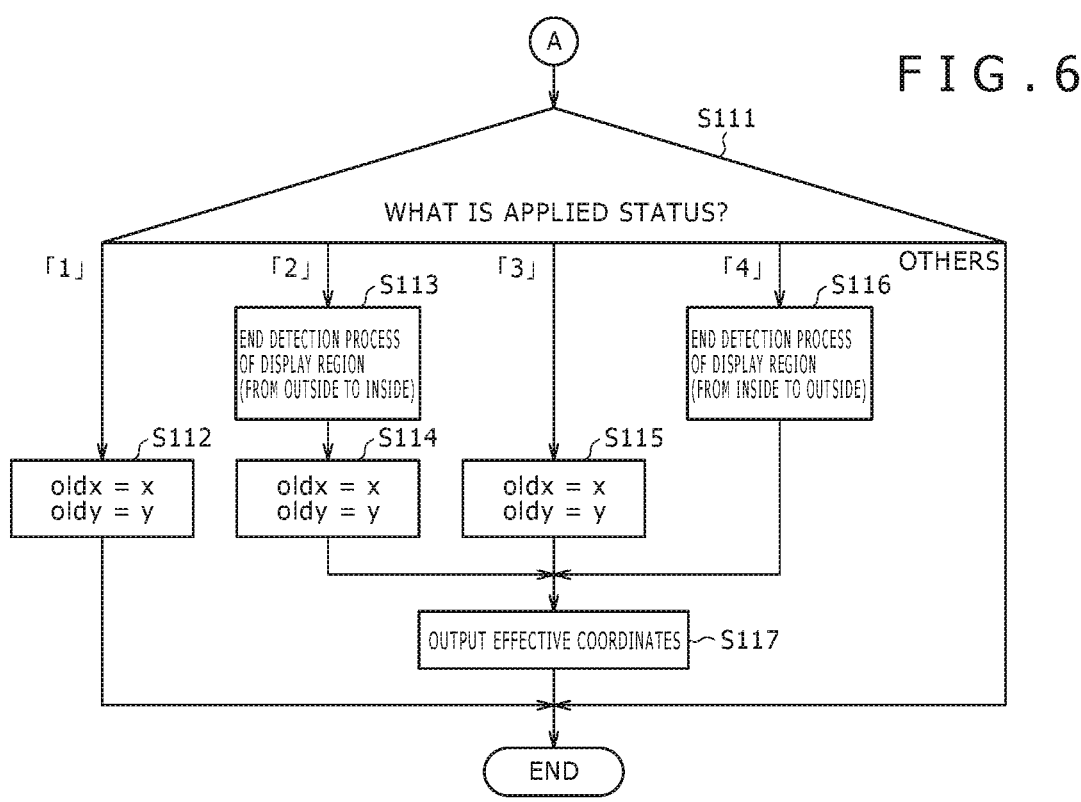

Then, following step S105, and steps S107 to S109, the position information outputting circuit 205 advances the processing to step S111 of FIG. 6, at which it determines the status applied to the position detection result of the pointer in the present cycle.

If it is determined at step S111 that the status applied to the position detection result of the pointer in the present cycle is "1" indicative of detection of the first point, then the position information outputting circuit 205 stores the coordinates (x, y) of the pointer detected in the present cycle, as coordinates of a preceding cycle detected position (oldx, oldy), into the buffer memory (step S112). Then, the position detection process routine in the present cycle ends without supplying the coordinates of the detected position of the first point to the control circuit 401.

If it is determined at step S111 that the status applied to the position detection result of the pointer in the present cycle is "2" indicative of detection of the second point, then the position information outputting circuit 205 executes a detection process of an end position of the display region during a moving operation from the outside to the inside of the display region 30A described above with reference to FIG. 3 (step S113). A flow chart of a detailed process in step S113 will be described later.

After step S113, the position information outputting circuit 205 stores the coordinates (x, y) of the pointer detected in the present cycle, as coordinates of a preceding detected position (oldx, oldy), into the buffer memory (step S114). Then, the position information outputting circuit 205 advances the processing to step S117, at which it outputs effective coordinates to the control circuit 401. At this time, with respect to the coordinates of the second point (status "2"), effective coordinates according to the result of the end detection process carried out at step S113 are outputted. In particular, if an end position of the display region 30A is detected, then the position information outputting circuit 205 outputs the coordinates of the detected end position as the effective coordinates to the control circuit 401 in place of the coordinates of the second point (or the coordinates of the first point), as described above. On the other hand, if an end position of the display region 30A is not detected by the end detection process at step S113, then the position information outputting circuit 205 outputs the coordinates of the second point as the effective coordinates to the control circuit 401.

If it is determined at step S111 that the status applied to the position detection result of the pointer in the present cycle is "3" indicative of detection of the third or succeeding point, then the position information outputting circuit 205 stores the coordinates (x, y) of the pointer detected in the present cycle, as the coordinates (oldx, oldy) of a preceding detected position (step S115). Then, the position information outputting circuit 205 advances the processing to step S117, at which it outputs the coordinates of the third or succeeding point as the effective coordinates to the control circuit 401.

If it is determined at this step S111 that the status applied to the position detection result of the pointer in the present cycle is "4," which indicates that the position detection result is a result of detection for the first time immediately after the pointer has left the display region 30A, then the position information outputting circuit 205 executes a detection process of an end position of the display region 30A during a moving operation from the inside to the outside of the display region 30A described hereinabove with reference to FIG. 4 (step S116). A flow chart of the process in step S116 will be described later.

Then, the position information outputting circuit 205 advances the processing to step S117, at which it outputs the effective coordinates to the control circuit 401. In this instance, the effective coordinates according to a result of the end detection process carried out at step S116 are outputted. In particular, when an end position of the display region is detected, the position information outputting circuit 205 outputs coordinates of the detected end position as the effective coordinates to the control circuit 401. On the other hand, if an end position is not detected by the end detection process at step S116, then the position information outputting circuit 205 determines that no effective coordinates exist and outputs no effective coordinates to the control circuit 401.

Further, if it is determined at step S111 that the status applied to the position detection result of the pointer in the present cycle is not any of the statuses "1" to "4," then the position information outputting circuit 205 ends the position detection processing routine in the present cycle without any output to the control circuit 401.

Figure 7:
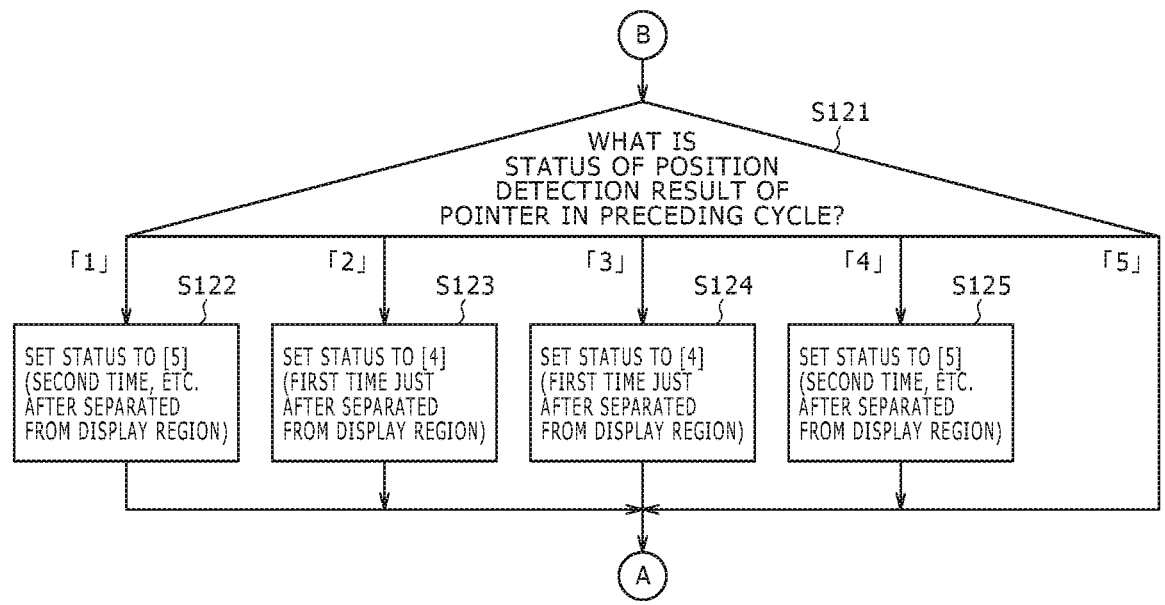

Returning to FIG. 5, if it is determined at step S102 that coordinates of a pointer are not detected, then the position information outputting circuit 205 determines the status of the position detection result of the pointer in a preceding cycle (step S121 of FIG. 7).

If it is determined at step S121 that the status of the position detection result of a pointer in the preceding cycle is the status "1" indicative of detection of the first point, then the position information outputting circuit 205 sets the status of the position detection result of a pointer in the present cycle to a status "5" indicating that the position detection result is a result of detection for the second or succeeding time after the pointer has left the display region 30A (step S122). The process at step S122 is based on the assumption that, if a position was detected as a position of the first point in the preceding cycle but a position is not detected in the present cycle, the detection of the first point in the preceding cycle is treated as noise.

If it is determined at step S121 that the status of the position detection result of the pointer in the preceding cycle is the status "2" indicative of detection of the second point, then the position information outputting circuit 205 sets the status of the position detection result of the pointer in the present cycle to the status "4" indicative of detection for the first time immediately after the pointer has left the display region 30A (step S123).

Also, if it is determined at step S121 that the status of the position detection result of the pointer in the preceding cycle is the status "3" indicative of detection of the third or succeeding point, then the position information outputting circuit 205 sets the status of the position detection result of the pointer in the present cycle to the status "4" indicative of detection for the first time immediately after the pointer has left the display region 30A (step S124).

If it is determined at step S121 that the status of the position detection result of the pointer in the preceding cycle is the status "4" indicative of detection for the first time immediately after the pointer has left the display region 30A, then the position information outputting circuit 205 sets the status of the position detection result of the pointer in the present cycle to the status "5" indicative of detection for the second or succeeding time immediately after the pointer has left the display region 30A (step S125).

If it is determined at step S121 that the status of the position detection result of the pointer in the preceding cycle is the status "5" indicative of detection for the second or succeeding time after the pointer has left the display region 30A, then the position information outputting circuit 205 applies no status to the position detection result of the pointer in the present cycle, and advances the processing to step S111 described above to repeat the process of step S111 and succeeding steps.

Also after steps S122 to S125 of FIG. 7, the position information outputting circuit 205 advances the processing to step S111 (FIG. 6) described above to repeat the process of step S111 and succeeding steps.

Now, an example of a flow of a detection process of an end position of the display region during a moving operation from the outside to the inside of the display region, at step S113 described above, is described with reference to FIGS. 8 and 9.

The position information outputting circuit 205 first calculates coordinates of the 0th point (nx, ny) based on coordinates of the first point (i.e., preceding detection coordinates (oldx, oldy) in the buffer memory) and coordinates of the second point (i.e., detected coordinates (x, y) in the present cycle), both of which are detected already. The equations for calculating the coordinates of the 0th point (nx, ny) are:

$$nx=x-(x-oldx)\times 2$$

$$ny=y-(y-oldy)\times 2.$$

Then, the position information outputting circuit 205 determines whether or not the coordinates of the 0th point (nx, ny) calculated at step S201 are outside the right end of the display region 30A and at the same time the coordinates of the second point (i.e., the coordinates (x, y) detected in the present cycle) are inside of the right end of the display region 30A (step S202). In particular, if the x coordinate of the right end position RT is AREA_RIGHT, then it is determined at step S202 whether or not $$nx \geq AREA\_RIGHT \text{ and } x<AREA\_RIGHT$$

are satisfied.

If it is determined at step S202 that the conditions described above are satisfied, then the position information outputting circuit 205 determines that the right end is passed by a sliding movement operation from the outside to the inside of the display region 30A, and calculates coordinates of the passing point (intersecting point) on the right end (step S203). In this example, the coordinates of the second point (i.e., coordinates (x, y) detected in the present cycle) and the coordinates of the 0th point (nx, ny) calculated at step S201 are used to calculate the coordinates of the intersecting point (tx, ty) between the passing locus of the sliding movement operation and the right end of the display region 30A, as follows:

$$tx=AREA\_RIGHT$$

$$ty=(ny-y)\times(AREA\_RIGHT-x)/(nx-x)+y$$

and the calculated coordinates are treated as effective coordinates. It is to be noted that, in this example, AREA_RIGHT=Xmax.

After step S203, it is determined whether or not the coordinates of the 0th point (nx, ny) calculated at step S201 are outside the left end of the display region 30A and at the same time the coordinates of the second point (i.e., coordinates (x, y) detected in the present cycle) are inside the left end of the display region 30A (step S204). Even when it is determined at step S202 that the conditions described above are not satisfied and therefore the 0th point is not outside the right end of the display region 30A, the position information outputting circuit 205 carries out the decision process at step S204 while skipping step S203.

The process at step S204 is to determine, where the x coordinate of the left end position LT is AREA_LEFT, whether $$nx \leq AREA\_LEFT \text{ and } x>AREA\_LEFT$$

are satisfied.

If it is determined at step S204 that the conditions described above are satisfied, then the position information outputting circuit 205 determines that the left end is passed by a sliding movement operation from the outside to the inside of the display region 30A, and calculates coordinates of the passing point (intersecting point) on the left end (step S205). In this example, the coordinates of the second point (i.e., coordinates (x, y) detected in the present cycle) and the coordinates of the 0th point (nx, ny) calculated at step S201 are used to calculate the coordinates of the intersecting point (tx, ty) between the passing locus of the sliding movement operation and the left end of the display region 30A, as follows:

$$tx=AREA\_LEFT$$

$$ty=(ny-y)\times(AREA\_LEFT-x)/(nx-x)+y$$

and the calculated coordinates are treated as effective coordinates. It is to be noted that, in this example, AREA_LEFT=0.

After step S205, it is determined whether or not the coordinates of the 0th point (nx, ny) calculated at step S201 are outside the upper end of the display region 30A and at the same time the coordinates of the second point (i.e., coordinates (x, y) detected in the present cycle) are inside the upper end of the display region 30A (step S206). Even when it is determined at step S204 that the conditions described above are not satisfied and therefore the 0th point is not outside the left end of the display region 30A, the position information outputting circuit 205 carries out the decision process at this step S206 while skipping step S205.

The process at step S206 is to determine, where the y coordinate of the upper end position TP of the display region 30A is AREA_TOP, whether $$ny \leq AREA\_TOP \text{ and } y > AREA\_TOP$$

are satisfied.

If it is determined at step S206 that the conditions described above are satisfied, then the position information outputting circuit 205 determines that the upper end is passed by a sliding movement operation from the outside to the inside of the display region 30A, and calculates coordinates of the passing point (intersecting point) on the upper end (step S207). In this example, the coordinates of the second point (i.e., coordinates (x, y) detected in the present cycle) and the coordinates of the 0th point (nx, ny) calculated at step S201 are used to calculate the coordinates of the intersecting point (tx, ty) between the passing locus of the sliding movement operation and the upper end of the display region 30A, as follows:

$$tx=(nx-x) \times (AREA\_TOP-y)/(ny-y)+x$$

$$ty=AREA\_TOP$$

It is to be noted that, in this example, AREA_TOP=0.

Subsequently, the position information outputting circuit 205 determines whether or not the calculated x coordinate tx of the intersecting point has a coordinate value between the left end and the right end of the display region 30A (step S211 of FIG. 9). In particular, the position information outputting circuit 205 determines whether or not $$AREA\_LEFT \leq tx \leq AREA\_RIGHT$$

is satisfied.

If it is determined at step S211 that the calculated x coordinate tx of the intersecting point has a coordinate value between the left end and the right end of the display region 30A, then the coordinates of the intersecting point calculated at step S207 are determined as the effective coordinates (step S212).

After step S212, it is determined whether or not the coordinates of the 0th point (nx, ny) calculated at step S201 are outside the lower end of the display region 30A and at the same time the coordinates of the second point (i.e., coordinates (x, y) detected in the present cycle) are inside the lower end of the display region 30A (step S206). Even when it is determined at step S206 that the conditions described above are not satisfied and the 0th point is not outside the upper end of the display region 30A, the position information outputting circuit 205 carries out the decision process at step S213 while skipping step S207.

The process at this step S213 is to determine, where the y coordinate of the lower end position BT of the display region 30A is AREA_BOTTOM, whether $$ny \geq AREA\_BOTTOM \text{ and } y < AREA\_BOTTOM$$

are satisfied.

If it is determined at step S213 that the conditions described above are satisfied, then the position information outputting circuit 205 determines that the lower end is passed by a sliding movement operation from the outside to the inside of the display region 30A, and calculates coordinates of the passing point (intersecting point) on the lower end (step S214). In this example, the coordinates of the second point (i.e., coordinates (x, y) detected in the present cycle) and the coordinates of the 0th point (nx, ny) calculated at step S201 are used to calculate the coordinates of the intersecting point (tx, ty) between the passing locus of the sliding movement operation and the lower end of the display region 30A, as follows:

$$tx=(nx-x) \times (AREA\_BOTTOM-y)/(ny-y)+x$$

$$ty=AREA\_BOTTOM$$

It is to be noted that, in this example, AREA_BOTTOM=Ymax.

Subsequently, the position information outputting circuit 205 determines whether or not the calculated x coordinate tx of the intersecting point has a coordinate value between the left end and the right end of the display region 30A (step S215). In particular, the position information outputting circuit 205 determines whether or not $$AREA\_LEFT \leq tx \leq AREA\_RIGHT$$

is satisfied.

If it is determined at step S215 that the calculated x coordinate tx of the intersecting point has a coordinate value between the left end and the right end of the display region 30A, then the coordinates of the intersecting point calculated at step S214 are determined as the effective coordinates (step S216).

Then, the position information outputting circuit 205 determines whether or not effective coordinates of an end position of the display region 30A have been determined (step S217). If effective coordinates of an end position of the display region 30A are not yet determined at step S217, then the processing routine ends. On the other hand, if it is determined at step S217 that effective coordinates of an end position of the display region 30A have been determined, then the position information outputting circuit 205 changes the effective coordinates in the present cycle to the effective coordinates (nx, ny) of the end position of the display region 30A, in place of the detected coordinates of the pointer (i.e., the coordinates of the second point) (step S218). The processing routine then ends.

Figure 8:
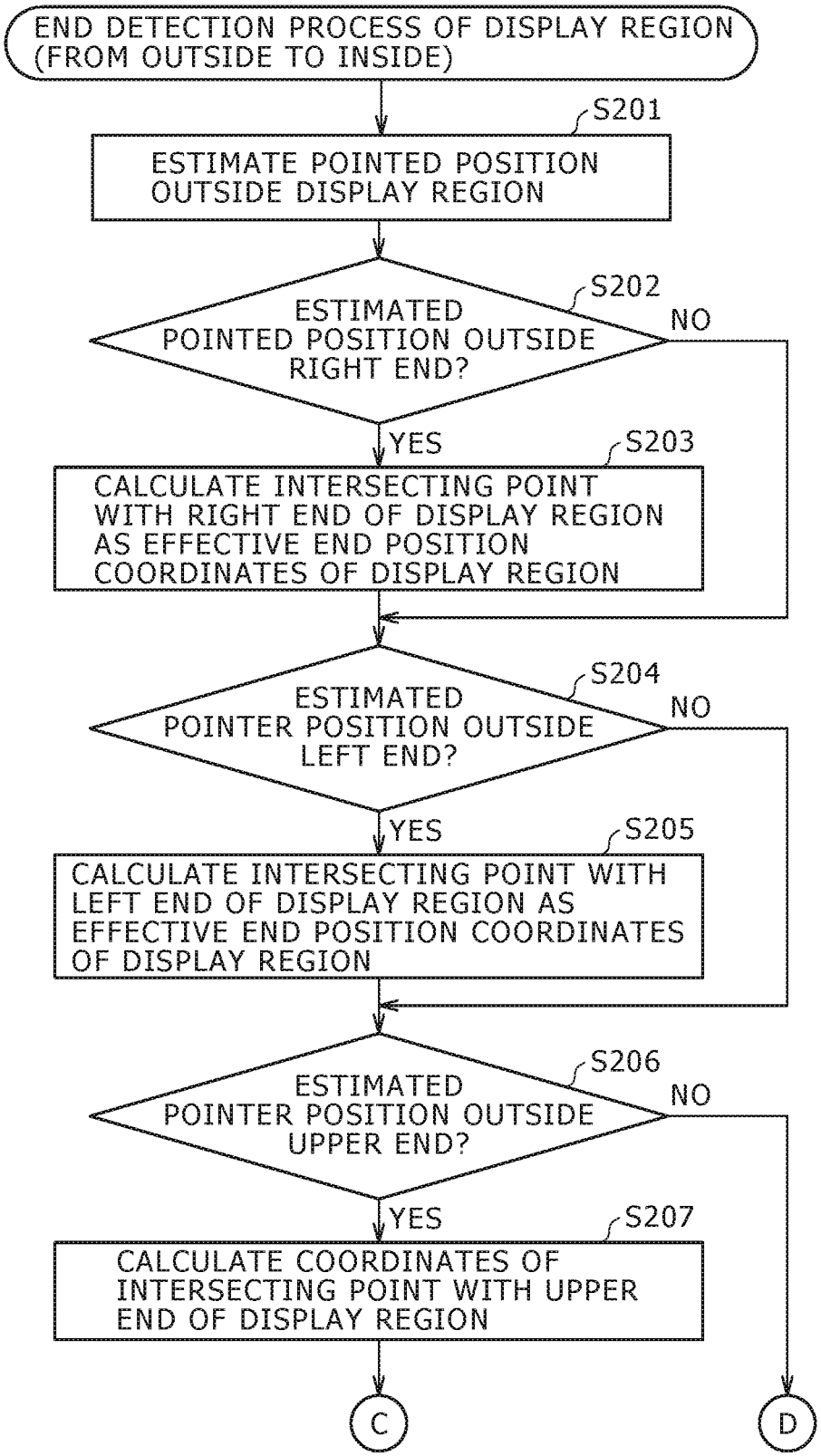
FIGS. 8 and 9 together illustrate another flow chart of an end position detection process performed relative to the display region of the electronic apparatus according to an embodiment of the present invention.
Figure 9:
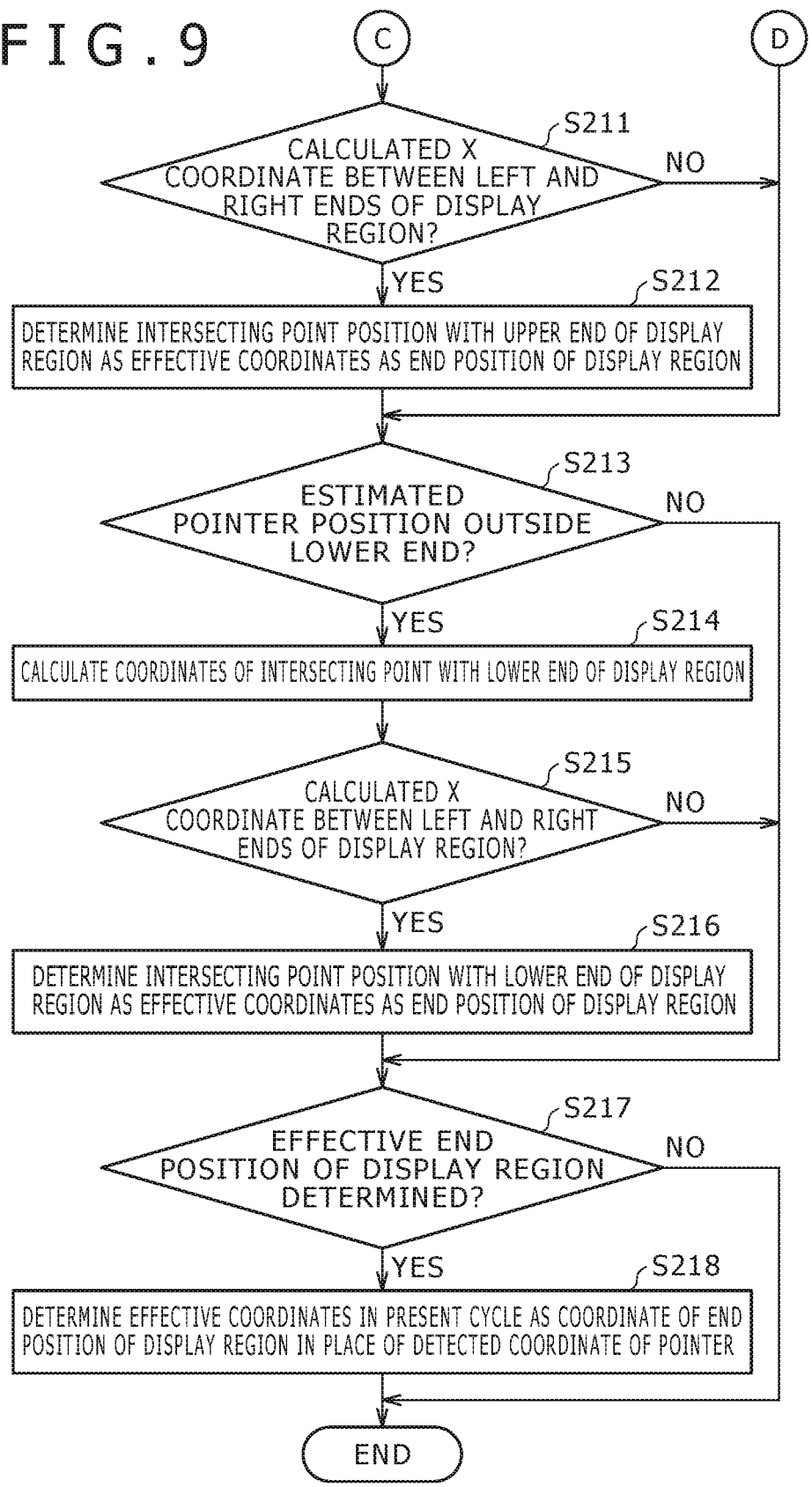
Figure 10:
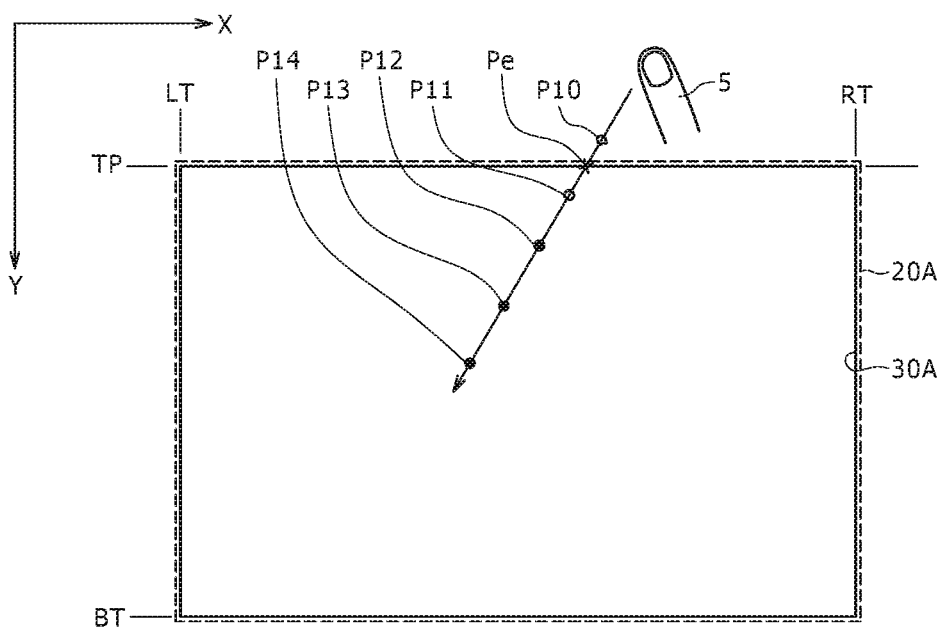
FIG. 10 is a view illustrating another example of an end position detection process performed relative to the display region of the electronic apparatus according to an embodiment of the present invention.

A flow of the detection process of an end position of the display region during a moving operation from the inside to the outside of the display region 30A, at step S116 described above, is similar to that of the flow charts of FIGS. 8 and 9. However, the detection process of an end position of the display region 30A during a moving operation from the inside to the outside of the display region 30A at step S116 described above is different from the detection process of an end position of the display region 30A during a moving operation from the outside to the inside of the display region 30A described above in that, in the former, the end position detection process is executed at a timing of the first cycle immediately after coordinates of the pointer are no longer detected and that, at step S201, the coordinates of the virtual point (nx, ny) are estimated and calculated as:

$$nx=x-(x-oldx)$$

$$ny=y-(y-oldy).$$

It is to be noted that, in the process at step S116, when an effective end position of the display region 30A is detected, coordinates of the effective end position of the display region 30A are outputted, in place of coordinates that cannot be detected as a result of the position detection of the pointer in the present cycle.

According to the embodiment described above, if a pointer is operated in such a manner as to pass one of a right end, a left end, an upper end, and a lower end of the display region 30A, then the end position of the display region 30A is detected as an intersecting point between the right, left, upper or lower end and a locus of the sliding movement operation. Therefore, when the user carries out a sliding movement operation of the pointer in such a manner as to pass through an end of the display region 30A, the end position can be detected with certainty.

Accordingly, it can be ensured to start up a controlling process in response to a sliding movement operation of a pointer that passes through an end of the display region 30A, to thereby avoid a situation in which such corresponding process is not started up despite the fact that a pointer operation that passes through an end of the display region 30A is performed.

In the present embodiment, since the position of a pointer outside the display region when the pointer passes through an end of the display region 30A during a sliding movement operation is estimated using position coordinates of the pointer in the display region 30A detected by the position detection sensor, the detection region 20A of the position detection sensor 20 may be sized equal to or a little greater than the display region 30A, as shown in FIGS. 3 and 4. Therefore, the size of the housing for the electronic apparatus can be made substantially equal to that of the display region 30A, and thus can be miniaturized.

Further, in the embodiment described above, an intersecting point between a right end, a left end, an upper end, or a lower end of the display region 30A and a locus of a sliding movement operation is made a coordinate output indicating that the end of the display region 30A is passed through by the sliding movement operation. In particular, the coordinate output indicating that an end of the display region 30A is passed through by a sliding movement operation is set as coordinates that fall along one line, which may be any of the left, upper, right, or lower end of the display region 30A, represented by x=0, y=0, x=Xmax, or y=Ymax, respectively. Therefore, due to such capability to detect coordinates along each of the four ends of the display region 30A, position detection can be carried out in the entire area within the periphery of the display region 30A, and an image object for guiding a user operation based on position detection may be displayed anywhere within the display region including even end portions thereof.

Further, according to the embodiment described above, an end position of the display region 30A can be detected not only upon a sliding movement operation from the outside to the inside of the display region 30A, but also upon a sliding movement operation from the inside to the outside of the display region 30A.

Modification to the First Embodiment

In the foregoing description of the first embodiment, upon a sliding movement operation by the pointer from the outside to the inside of the display region 30A, calculation of coordinates of an end position Pe of the display region 30A passed by the sliding movement operation is carried out at the second point in the display region 30A at which the position of a pointer is detected, and the calculated coordinates of the end position are outputted in place of a coordinate output of the second point or the first point.

However, although coordinates of an end position Pe of the display region 30A passed by a sliding movement operation are calculated at the second point in the display region 30A at which the position of a pointer is detected in the example described above, coordinates of the calculated end position Pe may be outputted in place of coordinates of a position P11 of the first point of the pointer 5 alone, and coordinates of the position P12 of the second point of the pointer 5 may be outputted.

In the foregoing description of the first embodiment, because the coordinates of the end position Pe of the display region 30A passed by a sliding movement operation are outputted in place of a coordinate output of the second point and the first point of the pointer in the display region 30A, detected position coordinates of the pointer supplied to the control circuit 401 are the coordinates of the end position Pe indicated by a mark "x" and coordinates of positions P13, P14, . . . each indicated by a solid black round mark, as shown in FIG. 3.

Consequently, although the pointer 5 is moving at a fixed speed, for example, since the coordinate output is different from the actual detected positions (because the actual detected positions P11 and P12 are not outputted and the outputted virtual position Pe is not an actual detected position but is merely an estimated virtual position), the control circuit 401 cannot detect the correct operation state of the pointer.

Figure 11:
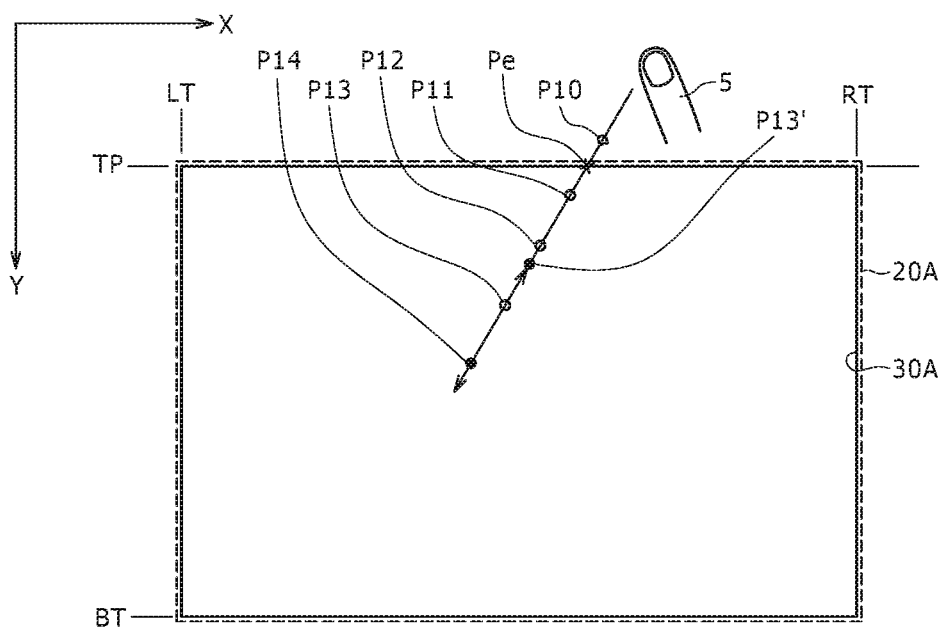
FIG. 11 is a view illustrating a further example of an end position detection process performed relative to the display region of the electronic apparatus according to an embodiment of the present invention.

Therefore, when the position P13 of the third point of the pointer 5 on the display region 30A is detected successfully, it may be preferable not to output the detected position coordinates of the third point as they are to the control circuit 401 and, instead, to correct the detected position coordinates of the third point so that the control circuit 401 can determine a moving state that corresponds to the moving operation of the pointer 5 and output the corrected coordinates of a position P13', as shown in FIG. 11.

In this example, when the detected position coordinates of the third point are acquired, the position information outputting circuit 205 estimates a position P14 of the fourth point from the coordinates of the position P12 of the second point prior to the third point and the coordinates of the position P13 of the third point. Then, the position information outputting circuit 205 calculates the coordinates of the position P13', which is corrected from the position P13 of the third point of the pointer, as midpoint position coordinates between the estimated coordinates of the estimated position P14 of the fourth point and the calculated coordinates of the end position Pe, for example. Then, the position information outputting circuit 205 outputs the calculated corrected coordinates of the position P13' to the control circuit 401 in place of the coordinates of the position P13 of the third point.

In the embodiment described above, upon a sliding movement operation of a pointer from the inside to the outside of the display region 30A, calculation of an end position of the passed end of the display region 30A is carried out at the first point outside the display region 30A after detection of the coordinates of the pointer becomes impossible.

However, it is also possible to determine an end position upon a sliding movement operation of a pointer from the inside to the outside of the display region 30A that passes through an end of the display region 30A, using position detected coordinates of two points upon a moving operation of the pointer in the display region 30A, similarly as upon a sliding movement operation of the pointer from the outside to the inside of the display region 30A.

In particular, coordinates of a pointer to be detected by the position detection process in the next cycle are calculated based on two detected coordinates of the pointer obtained successively and discretely at a predetermined time interval, such as 10 msec, pursuant to a method similar to that described in the embodiment above, that is, based on the coordinates of the pointer detected by the position detection process in the present cycle and the coordinates of the pointer detected by the position detection process in the preceding cycle.

Then, when it is determined that the calculated virtual position coordinates of the pointer will be outside the display region 30A, similar to the embodiment described above, an intersecting point between a sliding movement operation locus of the pointer and an end of the display region is calculated as end position coordinates, from the calculated virtual position coordinates of the pointer and the detected coordinates of the pointer in the present cycle. Then, the calculated end position coordinates are supplied to the control circuit 401.

In this case, the calculated end position coordinates may be supplied to the control circuit 401 in place of the detected coordinates of the pointer in the present cycle or may be supplied to the control circuit 401 together with the detected coordinates of the pointer in the present cycle. Further in this case, a flag indicating that the calculated end position coordinates are those of an end position of the display region 30A may be added to the calculated end position coordinates.

It is to be noted that the estimation calculation process of an end position upon a sliding movement operation of a pointer from the inside to the outside of the display region 30A, described above, may be carried out only in an area in proximity to an end of the display region 30A.

Second Embodiment

Figure 12:
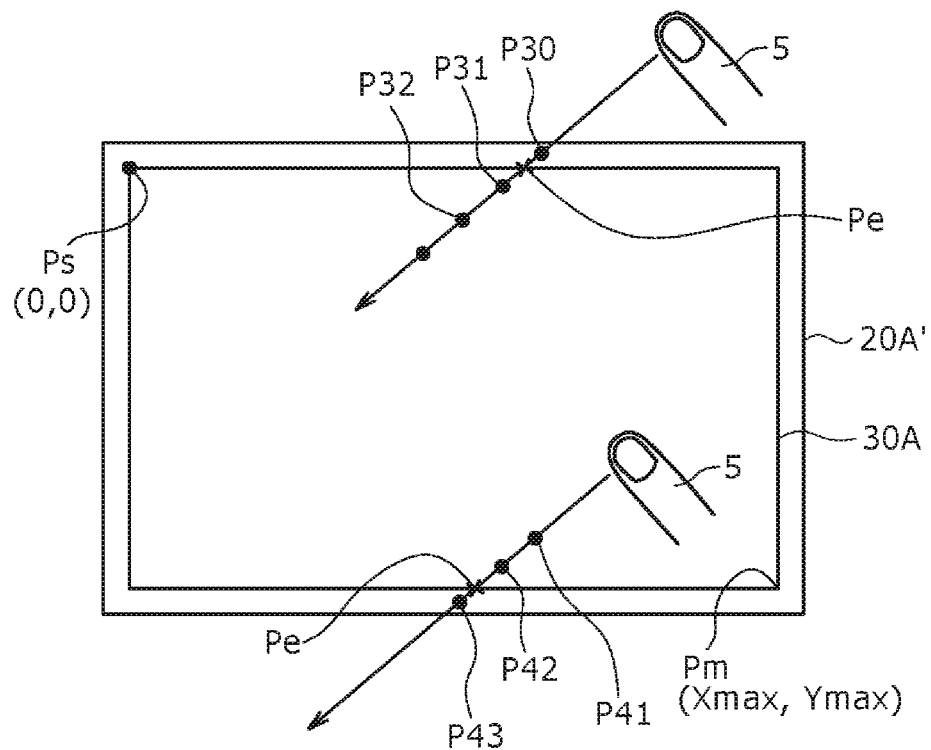
FIG. 12 is a view illustrating a still further example of an end position detection process performed relative to the display region of the electronic apparatus according to an embodiment of the present invention.
Figure 13A:
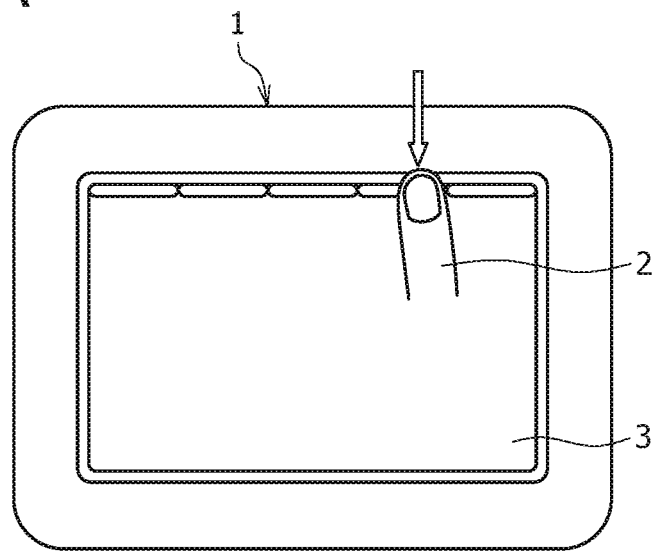
FIGS. 13A and 13B are views illustrating an example of a display controlling process for an electronic apparatus.
Figure 13B:
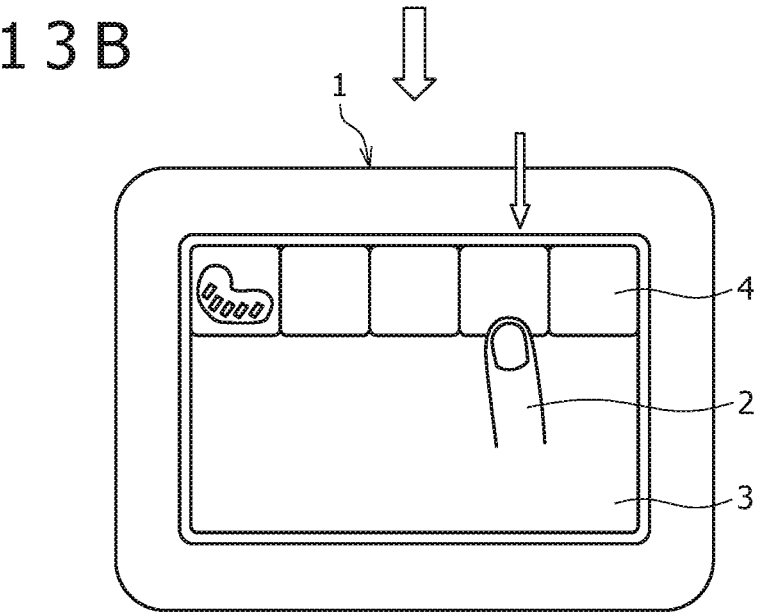

In the first embodiment described above, the size of the detection region 20A of the position detection sensor 20 is substantially equal to, or a little greater than, that of the display region 30A. However, as shown in FIG. 12, a detection region 20A' of the position detection sensor 20 may be made greater in size than the display region 30A so that a position detection output of a pointer may be obtained even when a sliding movement operation of a pointer is slow or when the electronic apparatus is sized to have room to accommodate such detecting region 20A'.

In the second embodiment, the detection region 20A' can detect a pointer in a region outside the display region 30A. Therefore, when a sliding movement operation of the pointer 5 is carried out from the outside to the inside of the display region 30A, a position P30 of the pointer 5 is detected outside the region of the display region 30A. Then, a position P31 of the pointer 5 is detected within the display region 30A.

Therefore, when it is detected that the position P30 as a result of the position detection process of the pointer in the preceding cycle is outside the display region and the position P31 as a result of the position detection process of the pointer in the present cycle is inside the display region, it can be determined that an end of the display region 30A is passed through by the sliding movement operation of the pointer. Then, an end position Pe of the display region 30A passed by the slidable movement of the pointer can be calculated using coordinates of the position P31 of the pointer 5 in the display region and coordinates of the position P30 of the pointer 5 outside the display region.

On the other hand, when a sliding movement operation of the pointer 5 is carried out from the inside to the outside of the display region 30A, positions P41 and P42 of the pointer 5 are detected in the display region 30A. Then, after lapse of a predetermined time, a position P43 of the pointer 5 is detected outside the region of the display region 30A.

Therefore, when it is detected that position P42, as a result of the position detection process of the pointer in the preceding cycle, is inside the display region 30A and position P43, as a result of the position detection process of the pointer in the present cycle of the pointer, is outside the display region 30A, it is possible to determine that an end of the display region 30A is passed through by the sliding movement operation of the pointer. Then, end position Pe of the display region 30A passed by the slidable movement of the pointer can be calculated using coordinates of position P42 of the pointer 5 inside the display region 30A and coordinates of position P43 of the pointer outside the display region 30A.

Accordingly, in the second embodiment, it becomes unnecessary to carry out the process of estimating and calculating the position of the pointer outside the display region 30A based on coordinates of two pointer detected positions inside the display region 30A, as in the first embodiment described above.

Other Embodiments and Modifications

In the first embodiment described above, in order to distinguish whether the end position is an end position which is passed upon a sliding movement from the outside to the inside of the display region or upon a sliding movement from the inside to the outside of the display region, a flag is applied to indicate in which direction the sliding movement is carried out. However, when there is no necessity to identify the direction of a sliding movement, there is no need to apply a flag. On the other hand, a flag that indicates that an end position of the display region is passed upon a sliding movement may be added to coordinates of the end position of the display region.

While, in the embodiments described above, coordinates of a right end, a left end, an upper end, or a lower end of the display region are outputted as coordinates of an end of the display region, coordinates outside (exterior to) the display region may be outputted as coordinates of an end of the display region. In this case, the control circuit detects that an end position of the display region is passed by a sliding movement operation of the pointer when the control circuit receives particular coordinates outside of the display region, for example.

While, in the description above, a single finger is used for operation, when a plurality of fingers are used simultaneously, an end position of the display region based on a sliding movement operation of each of the fingers can be similarly detected.

While, in the embodiments described above, the position detection sensor is a position detection sensor of the capacitive type, it is not limited to the capacitive type sensor. For example, a position detection sensor of the electromagnetic induction type or a position detection sensor of the resistance film type may be used. However, in the case of a position detection sensor of the electromagnetic induction type, the position detector sensor is disposed not between the plane member and the display device, but instead disposed "under" the display device, i.e., on the side of the display device opposite to its side that faces the plane member. The position detection sensor of the electromagnetic induction type detects the position of a pointer by receiving a radio wave from the position pointer. Details of a position detection sensor of the electromagnetic induction type are known and described, for example, in Japanese Patent Laid-Open No. 2007-164356, so a detailed description thereof is omitted herein.

While, in the embodiments described above, the electronic apparatus is described as a portable telephone terminal, the present invention can be applied not only to a portable telephone terminal but also to a pad type terminal, a notebook type personal computer, a display apparatus connected to the main body of a personal computer, and so forth.

The invention claimed is:

1. A method executed in a touch controller coupled to a position detection sensor, the method comprising:
    periodically detecting a position of a pointer on the position detection sensor at a defined time cycle;
    detecting a first position of the pointer on the position detection sensor, setting a status counter to a first state, and storing the first position in a memory;
    detecting a second position of the pointer at the defined time cycle after a timing of the detection of the first position, setting the status counter to a second state, determining whether the pointer has passed an edge of a display region of the position detection sensor based on the first position and the second position, wherein
        (i) in response to determining that the pointer has passed the edge of the display region, outputting an estimated end position associated with the passing of the edge, instead of outputting the first position or the second position, and
        (ii) else, outputting the second position; and
    detecting a third position of the pointer on the position detection sensor, setting the status counter to a third state, and outputting the third position without the determining of whether the pointer has passed an edge of the display region.

2. The method according to claim 1, wherein the determining is called when the status counter is in the second state but not when the status counter is in the third state.

3. The method according to claim 2, wherein the second state is a state in which a second effective position consecutive to the first position is detected, and the third state is a state in which a third or later effective position is detected.

4. The method according to claim 1, comprising:
    managing the status counter to determine whether the status counter is in the second state or in other states when a new position is detected.

5. The method according to claim 1, wherein the estimated end position is on the edge of the display region.

6. The method according to claim 1, wherein the estimated end position, in operation, triggers an external controller coupled to the touch controller to execute a defined operation.

7. The method according to claim 6, wherein the defined operation includes recognizing a swipe-in movement of the pointer.

8. The method according to claim 6, wherein the defined operation includes displaying a menu in the display region.

9. The method according to claim 6, wherein the defined operation includes displaying different menus depending on different locations of the estimated end position, respectively.

10. A touch controller coupled to a position detection sensor, the touch controller comprising:
    a processor; and
    a memory including computer-executable instructions, which cause the processor to perform:
    periodically detecting a position of a pointer on the position detection sensor at a defined time cycle;
    detecting a first position of the pointer on the position detection sensor, setting a status counter to a first state, and storing the first position in the memory;
    detecting a second position of the pointer at the defined time cycle after a timing of the detection of the first position, setting the status counter to a second state, determining whether the pointer has passed an edge of a display region of the position detection sensor based on the first position and the second position, wherein
        (i) in response to determining that the pointer has passed the edge of the display region, outputting an estimated end position associated with the passing of the edge, instead of outputting the first position or the second position, and
        (ii) else, outputting the second position; and
    detecting a third position of the pointer on the position detection sensor, setting the status counter to a third state, and outputting the third position without the determining of whether the pointer has passed an edge of the display region.

11. The touch controller according to claim 10, wherein the processor calls the determining when the status counter is in the second state but not when the status counter is in the third state.

12. The touch controller according to claim 11, wherein the second state is a state in which a second effective position consecutive to the first position is detected, and the third state is a state in which a third or later effective position is detected.

13. The touch controller according to claim 10, wherein the processor manages the status counter to determine whether the status counter is in the second state or in other states when a new position is detected.

14. The touch controller according to claim 10, wherein the estimated end position is on the edge of the display region.

15. The touch controller according to claim 10, wherein the estimated end position, in operation, triggers an external controller coupled to the touch controller to execute a defined operation.

16. The touch controller according to claim 15, wherein the defined operation includes recognizing a swipe-in movement of the pointer.

17. The touch controller according to claim 15, wherein the defined operation includes displaying a menu in the display region.

18. The touch controller according to claim 15, wherein the defined operation includes displaying different menus depending on different locations of the estimated end position, respectively.

* * * * *

UNITED STATES PATENT AND TRADEMARK OFFICE
CERTIFICATE OF CORRECTION

PATENT NO. : 10,599,312 B2  
APPLICATION NO. : 15/952617  
DATED : March 24, 2020  
INVENTOR(S) : Takeshi Kobori et al.

Page 1 of 1

It is certified that error appears in the above-identified patent and that said Letters Patent is hereby corrected as shown below:

On the Title Page

Item (56), References Cited, Foreign Patent Document No. 2:
"JP" should read, --EP--.

Signed and Sealed this  
First Day of September, 2020

Andrei Iancu  
*Director of the United States Patent and Trademark Office*